(12) United States Patent
Coban et al.

(10) Patent No.: US 9,083,983 B2
(45) Date of Patent: Jul. 14, 2015

(54) MOTION VECTOR PREDICTOR CANDIDATE CLIPPING REMOVAL FOR VIDEO CODING

(75) Inventors: Muhammed Zeyd Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 477 days.

(21) Appl. No.: 13/532,392

(22) Filed: Jun. 25, 2012

(65) Prior Publication Data

US 2013/0083853 A1 Apr. 4, 2013

Related U.S. Application Data

(60) Provisional application No. 61/543,181, filed on Oct. 4, 2011, provisional application No. 61/553,053, filed on Oct. 28, 2011.

(51) Int. Cl.
*H04N 7/26* (2006.01)
*H04N 19/55* (2014.01)
*H04N 19/563* (2014.01)
(Continued)

(52) U.S. Cl.
CPC .............. *H04N 19/55* (2014.11); *H04N 19/51* (2014.11); *H04N 19/52* (2014.11); *H04N 19/563* (2014.11)

(58) Field of Classification Search
CPC ....... H04N 19/51; H04N 19/52; H04N 19/55; H04N 19/563
USPC .......................................................... 375/240
See application file for complete search history.

(56) References Cited

U.S. PATENT DOCUMENTS 7,206,346 B2 * 4/2007 Shimizu et al. .......... 375/240.17
7,376,186 B2   5/2008 Boyce et al.
(Continued)

FOREIGN PATENT DOCUMENTS

JP   2005065239 A   3/2005
WO  2007119198 A1  10/2007
WO  2011099468 A1   8/2011

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.

(Continued)

*Primary Examiner* — Dave Czekaj
*Assistant Examiner* — Mohammad J Rahman
(74) *Attorney, Agent, or Firm* — Shumaker & Sieffert, P.A.

(57) ABSTRACT

This disclosure describes techniques for coding a video block based on an unclipped version of a motion vector predictor candidate. The techniques include determining a motion vector predictor candidate list including motion vector predictor candidates from neighboring video blocks without clipping the motion vector predictor candidates. More specifically, if one of the motion vector predictor candidates points to a prediction block located outside of a reference picture boundary relative to the current video block, the techniques allow an unclipped version of the motion vector predictor candidate to be included in the candidate list. The current video block is then coded based on a determined unclipped motion vector predictor candidate of the candidate list. Elimination of the motion vector predictor candidate clipping process reduces complexity at both the video encoder and the video decoder.

20 Claims, 7 Drawing Sheets

(51) Int. Cl.
*H04N 19/52* (2014.01)
*H04N 19/51* (2014.01)

(56) References Cited

U.S. PATENT DOCUMENTS

| | | | |
|---|---|---|---|
| 2003/0152149 A1 | 8/2003 | Denolf | |
| 2005/0013498 A1* | 1/2005 | Srinivasan et al. | 382/239 |
| 2006/0034529 A1 | 2/2006 | Park et al. | |
| 2009/0074073 A1 | 3/2009 | Srinivasan et al. | |
| 2009/0135909 A1 | 5/2009 | Chen et al. | |
| 2010/0086051 A1* | 4/2010 | Park et al. | 375/240.16 |
| 2013/0003850 A1* | 1/2013 | Sugio et al. | 375/240.16 |
| 2013/0034161 A1* | 2/2013 | Sugio et al. | 375/240.16 |
| 2013/0094586 A1* | 4/2013 | Amitay et al. | 375/240.16 |
| 2013/0294525 A1* | 11/2013 | Norkin et al. | 375/240.24 |
| 2013/0308708 A1* | 11/2013 | Sugio et al. | 375/240.24 |
| 2014/0321542 A1* | 10/2014 | Lim et al. | 375/240.12 |

OTHER PUBLICATIONS

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Coban, et al., "Motion Vector Predictor Candidate Clipping Removal", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16 ); URL:http://wftp3.itu.int/av-arch/jctvc-site/,, No. JCTVC-G134, XP030110118, 9 pp.

International Search Report and Written Opinion—PCT/US2012/054641—ISA/EPO—Feb. 27, 2013, 14 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Jung, et al., "Competition-Based Scheme for Motion Vector Selection and Coding", VCEG Meeting; MPEG Meeting; Jul. 17, 2006-Jul. 17, 2006; Klagenfurt, AT; (Video Coding Experts Group of ITU-T SG.16), No. VCEG-AC06r1, XP030003490, ISSN: 0000-0446, 7 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand, T., et al., "WD3: Working Draft 3 of High-Efficiency Video Coding," Document JCTVC-E603, 5th Meeting: Geneva, CH, Mar. 16-23, 2011, pp. 193.

Wiegand et al., "Overview of the H.264/AVC Video Coding Standard", IEEE Transactions on Circuits and Systems for Video Technology, IEEE Service Center, Piscataway, NJ, US, vol. 13, No. 7, Jul. 1, 2003 pp. 560-576, XP011221093, ISSN: 1051-8215, DOI: DOI:10.1109/TCSVT.2003.815165

Zheng, et al., "CE9: Unified Merge and AMVP candidates selection (UNI03)", JCT-VC Meeting; MPEG Meeting; Jul. 14, 2011-Jul. 22, 2011; Torino; (Joint Collaborative Team on Video Coding of ISO/IEC JTC1/SC29/WG11 and ITU-T SG.16); URL: http://wftp3.itu.int/av-arch/jctvc-site/ No. JCTVC-F297, XP030009320, 12 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Second Written Opinion from International Application No. PCT/US2012/054641, dated Oct. 2, 2013, 6 pp.

International Preliminary Report on Patentability from International Application No. PCT/US2012/054641, dated Jan. 24, 2014, 9 pp.

Itani, et al., "Improvement to AMVP/Merge process," Joint Collaborative Team on Video Coding (JCT—VC)of ITU—T SG16 WP3 and ISO/IEC JTC1/SC29/WG11, 5th Meeting: Geneva, CH, Marc, 2011, JCTVC—E064_r1, 8 pages.

Sugio, et al.,"Non-CE9: Simplified scaling calculation method for temporal/spatial MVP of AMVP/Merge", JCT—VC Meeting; MPEG Meeting; Nov. 21-30, 2011; Geneva; (Joint Collaborative Team on Video Coding of ISO/IEC JTC1/SC29/WG11 and ITU-TSG.16); URL:http://WFTP3.ITU.INT/AV-ARCH/JCTVC-SITE/, No. JCTVC—G541, XP030110525, 8 pages.

\* cited by examiner

MOTION VECTOR PREDICTOR CANDIDATE CLIPPING REMOVAL FOR VIDEO CODING

This application claims priority to U.S. Provisional Application No. 61/543,181, filed Oct. 4, 2011, and U.S. Provisional Application No. 61/553,053, filed Oct. 28, 2011, both of which are hereby incorporated by reference in their entirety.

TECHNICAL FIELD

This disclosure relates to video coding and, more particularly, video inter-coding techniques.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques may include spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction uses a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes techniques for coding a video block based on an unclipped version of a motion vector predictor candidate. The techniques includes determining a motion vector predictor candidate list including motion vector predictor candidates from neighboring video blocks without clipping the motion vector predictor candidates. If one of the motion vector predictor candidates points to a prediction block located outside of a reference picture boundary relative to the current video block, the techniques of this disclosure allow an unclipped version of the motion vector predictor candidate to be included in the candidate list. If the unclipped motion vector predictor candidate is determined to be used in a motion vector prediction process, the unclipped motion vector may be clipped to relocate the prediction block within a padding region around the reference picture during a motion compensation process.

In the current HEVC Test Model (HM), two motion vector prediction modes are supported: merge mode and adaptive motion vector prediction (AMVP) mode. In either mode, a video coding device determines a motion vector predictor candidate list from which to determine a motion vector predictor for a current video block. Traditionally, if any of the motion vector predictor candidates point to a prediction block located outside of a reference picture boundary relative to the current video block, the video coding device would clip the motion vector predictor candidate to ensure that the entire prediction block is relocated within a padding region around the reference picture.

According to the techniques of this disclosure, the motion vector predictor candidate clipping process is removed from the candidate list generation process. Specifically, when a motion vector predictor candidate of the candidate list points to a prediction block located outside of a reference picture boundary, the video coding device will not clip or otherwise truncate the value of the motion vector predictor candidate. The current video block is then coded based on a determined unclipped motion vector predictor candidate of the candidate list. A motion vector from the candidate list may be clipped if determined for use in motion compensation. Elimination of the motion vector predictor candidate clipping process reduces complexity at both the video encoder and the video decoder.

In one example of the disclosure, a method for coding video data is proposed. The method comprises determining a motion vector predictor candidate list that includes motion vector predictor candidates from neighboring video blocks without clipping the motion vector predictor candidates, wherein, if a motion vector predictor candidate identifies a prediction block located outside a reference picture boundary relative to a current video block, an unclipped version of the motion vector predictor candidate is included in the candidate list, and coding the current video block based on a determined unclipped motion vector predictor candidate of the candidate list.

In another example of the disclosure, an apparatus configured to code video data is proposed. The apparatus comprises means for determining a motion vector predictor candidate list that includes motion vector predictor candidates from neighboring video blocks without clipping the motion vector predictor candidates, wherein, if a motion vector predictor candidate identifies a prediction block located outside a reference picture boundary relative to a current video block, an unclipped version of the motion vector predictor candidate is included in the candidate list, and means for coding the current video block based on a determined unclipped motion vector predictor candidate of the candidate list.

In another example of the disclosure, an apparatus configured to code video data is proposed. The apparatus comprises a video coder configured to determine a motion vector predictor candidate list that includes motion vector predictor candidates from neighboring video blocks without clipping the motion vector predictor candidates, wherein, if a motion vector predictor candidate identifies a prediction block located outside a reference picture boundary relative to a current video block, an unclipped version of the motion vector predictor candidate is included in the candidate list, and to code the current video block based on a determined unclipped motion vector predictor candidate of the candidate list.

In another example of the disclosure, a computer-readable medium storing instructions for causing a processor configured to code video data is proposed. The processor is configured to determine a motion vector predictor candidate list that includes motion vector predictor candidates from neighboring video blocks without clipping the motion vector predictor candidates, wherein, if a motion vector predictor candidate identifies a prediction block located outside a reference picture boundary relative to a current video block, an unclipped version of the motion vector predictor candidate is included in the candidate list, and to code the current video block based on a determined unclipped motion vector predictor candidate of the candidate list.

The details of one or more examples are set forth in the accompanying drawings and the description below. Other features, objects, and advantages will be apparent from the description and drawings, and from the claims.

DETAILED DESCRIPTION

Figure 1:
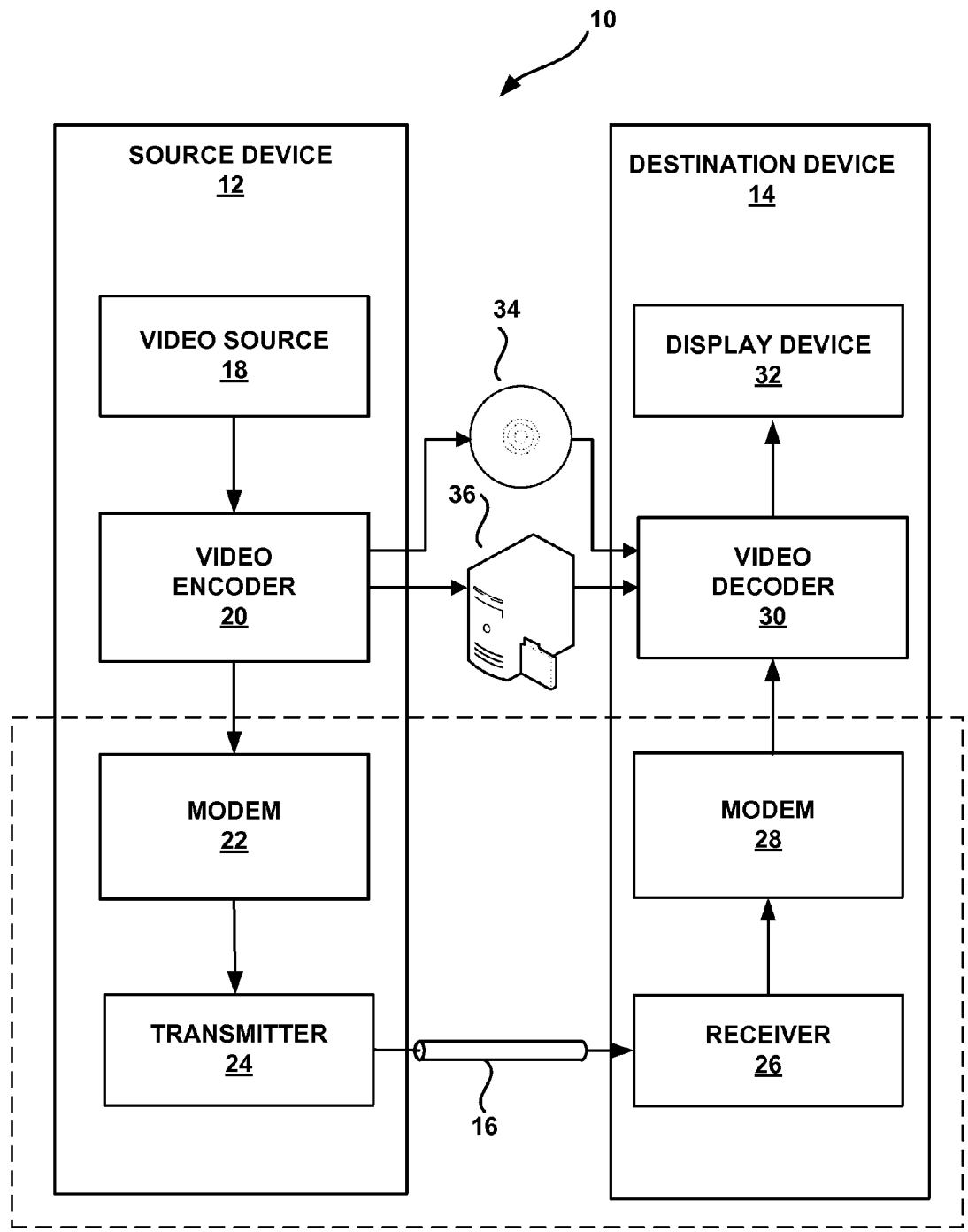
FIG. 1 is a block diagram illustrating an example video encoding and decoding system that may utilize the techniques described in this disclosure.

FIG. 1 is a block diagram illustrating an example video encoding and decoding system 10 that may utilize the inter-prediction techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In another example, encoded video may also be stored on a storage medium 34 or a file server 36 and may be accessed by the destination device 14 as desired. The storage medium may include any of a variety of locally accessed data storage media such as Blu-ray discs, DVDs, CD-ROMs, flash memory, or any other suitable digital storage media for storing encoded video data. Storage medium 34 or file server 36 may be any other intermediate storage device that may hold the encoded video generated by source device 12, and that destination device 14 may access as desired via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the file server may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by the video encoder 20. The encoded video information may be modulated by the modem 22 according to a communication standard, such as a wireless communication protocol, and transmitted to the destination device 14 via the transmitter 24. The modem 22 may include various mixers, filters, amplifiers or other components designed for signal modulation. The transmitter 24 may include circuits designed for transmitting data, including amplifiers, filters, and one or more antennas.

The destination device 14, in the example of FIG. 1, includes a receiver 26, a modem 28, a video decoder 30, and a display device 32. The receiver 26 of the destination device 14 receives information over the channel 16, and the modem 28 demodulates the information to produce a demodulated bitstream for the video decoder 30. The information communicated over the channel 16 may include a variety of syntax information generated by the video encoder 20 for use by the video decoder 30 in decoding video data. Such syntax may also be included with the encoded video data stored on a storage medium 34 or a file server 36. Each of the video encoder 20 and the video decoder 30 may form part of a respective encoder-decoder (CODEC) that is capable of encoding or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The video encoder 20 may implement any or all of the techniques of this disclosure to code motion vectors. As one example, video encoder 20 may be configured to determine a motion vector predictor candidate list that includes motion vector predictor candidates from neighboring video blocks without clipping the motion vector predictor candidates, wherein, if a motion vector predictor candidate identifies a prediction block located outside a reference picture boundary relative to a current video block, an unclipped version of the motion vector predictor candidate is included in the candidate list, to code the current video block based on a determined unclipped motion vector predictor candidate of the candidate list.

Likewise, the video decoder 30 may implement any or all of the techniques of this disclosure to code motion vectors. As one example, video decoder 30 may be configured to determine a motion vector predictor candidate list that includes motion vector predictor candidates from neighboring video blocks without clipping the motion vector predictor candidates, wherein, if a motion vector predictor candidate identifies a prediction block located outside a reference picture boundary relative to a current video block, an unclipped version of the motion vector predictor candidate is included in the candidate list, to code the current video block based on a determined unclipped motion vector predictor candidate of the candidate list.

A video coder, as described in this disclosure, may refer to a video encoder or a video decoder. Similarly, a video encoder and a video decoder may be referred to as video encoding units and video decoding units, respectively. Likewise, video coding may refer to video encoding or video decoding.

The Joint Collaborative Team on Video Coding (JCT-VC) is currently working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five (33 directional, 1 DC, 1 planar) intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A CU having one or more PUs may also include one or more transform units (TUs). Following prediction, video encoder 20 may calculate residual values corresponding to the PU. The residual values comprise pixel difference values between a current block of video data and a predictive block of video data. The residual values may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data. The PUs may comprise pixel data in the spatial domain (also referred to as the pixel domain). A TU may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and a predictive video block. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy Codes (PIPE) or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Figure 2:
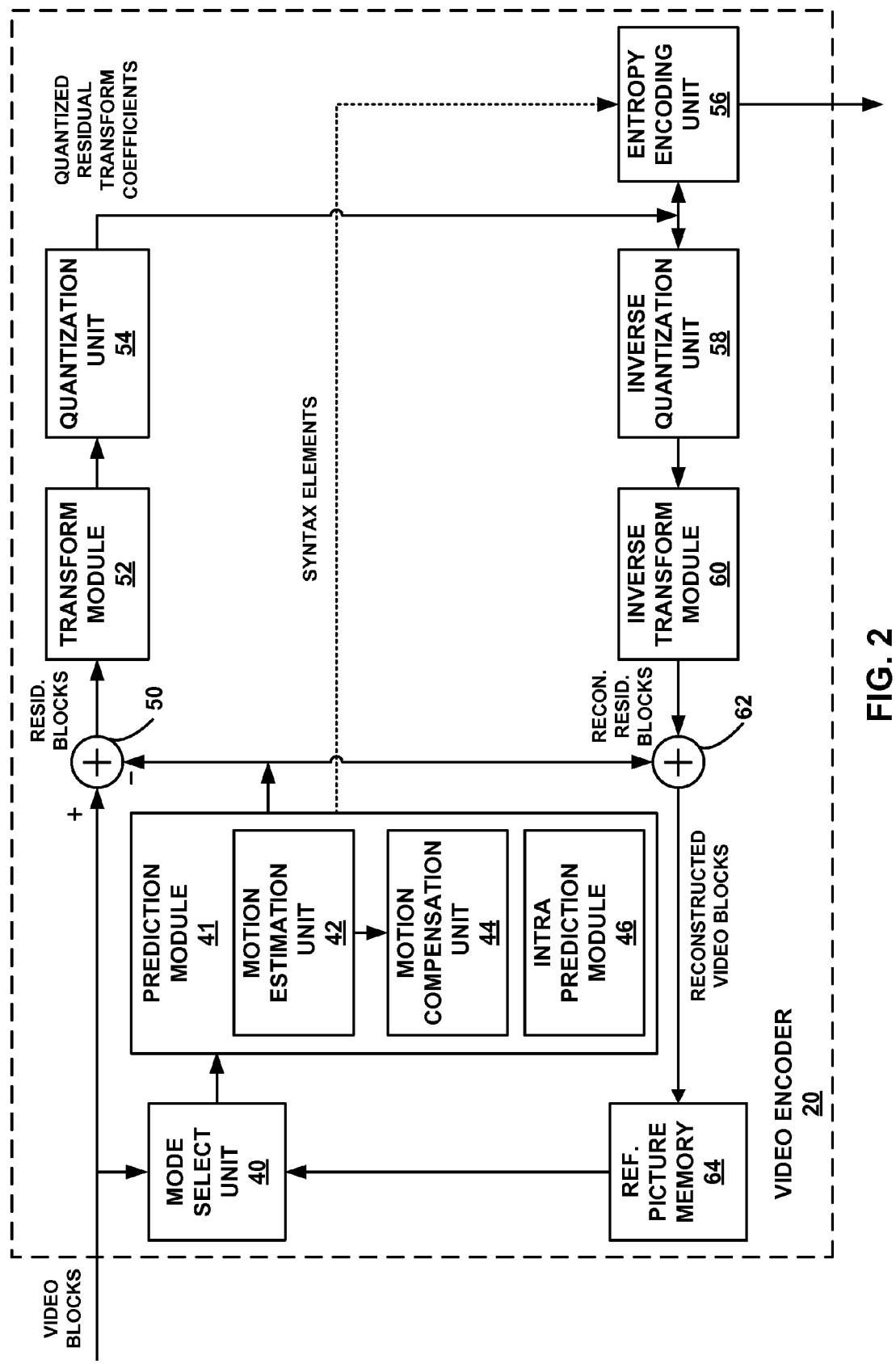
FIG. 2 is a block diagram illustrating an example video encoder that may implement the techniques described in this disclosure.

FIG. 2 is a block diagram illustrating an example video encoder 20 that may implement the inter-prediction techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes mode select unit 40, prediction module 41, reference picture memory 64, summer 50, transform module 52, quantization unit 54, and entropy encoding unit 56. Prediction module 41 includes motion estimation unit 42, motion compensation unit 44, and intra prediction module 46. For video block reconstruction, video encoder 20 also includes inverse quantization unit 58, inverse transform module 60, and summer 62. A deblocking filter (not shown in FIG. 2) may also be included to filter block boundaries to remove blockiness artifacts from reconstructed video. If desired, the deblocking filter would typically filter the output of summer 62.

As shown in FIG. 2, video encoder 20 receives a current video block within a video slice to be encoded. The slice may be divided into multiple video blocks. Mode select unit 40 may select one of the coding modes, intra or inter, for the current video block based on error results, and prediction module 41 may provide the resulting intra- or inter-coded block to summer 50 to generate residual block data and to summer 62 to reconstruct the encoded block for use as a reference picture.

Intra prediction module 46 within prediction module 41 may perform intra-predictive coding of the current video block relative to one or more neighboring blocks in the same frame or slice as the current block to be coded to provide spatial compression. Motion estimation unit 42 and motion compensation unit 44 within prediction module 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may calculate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be determined from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After motion compensation unit 44 generates the predictive block for the current video block, video encoder 20 forms a residual video block by subtracting the predictive block from the current video block. The residual video data in the residual block may be included in one or more TUs and applied to transform module 52. Transform module 52 transforms the residual video data into residual transform coefficients using a transform, such as a discrete cosine transform (DCT) or a conceptually similar transform. Transform module 52 may convert the residual video data from a pixel domain to a transform domain, such as a frequency domain.

Transform module 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), or another entropy encoding technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform module 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture. Details of the invention with respect to video encoder 20 of FIG. 2 will be described in more detail below.

Figure 3:
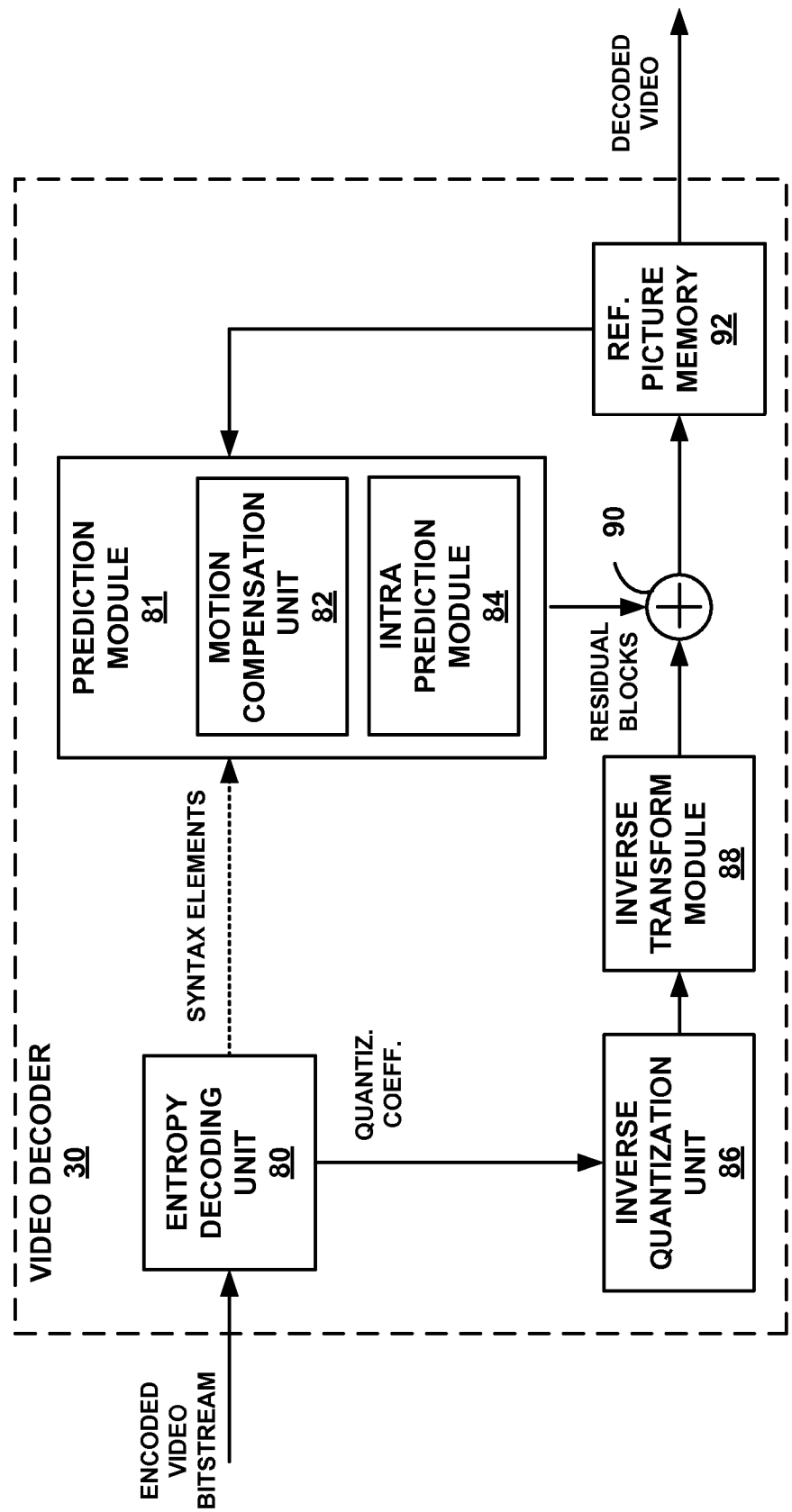
FIG. 3 is a block diagram illustrating an example video decoder that may implement the techniques described in this disclosure.

FIG. 3 is a block diagram illustrating an example video decoder 30 that may implement the inter-prediction techniques described in this disclosure. In the example of FIG. 3, video decoder 30 includes an entropy decoding unit 80, prediction module 81, inverse quantization unit 86, inverse transformation unit 88, summer 90, and reference picture memory 92. Prediction module 81 includes motion compensation unit 82 and intra prediction module 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction module 81. Video decoder 30 may receive the syntax elements at the video slice level and/or the video block level.

When the video slice is coded as an intra-coded (I) slice, intra prediction module 84 of prediction module 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction module 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. Motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform module 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform module 88 with the corresponding predictive blocks generated by motion compensation unit 82. Summer 90 represents the component or components that perform this summation operation. If desired, a deblocking filter may also be applied to filter the decoded blocks in order to remove blockiness artifacts. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1. Details of the invention with respect to video decoder 30 of FIG. 3 will be described in more detail below.

As discussed above with reference to FIG. 2 and FIG. 3, coding a PU using inter-prediction involves calculating a motion vector between a current block and a block in a reference frame. Motion vectors are calculated through a process called motion estimation (or motion search) (e.g., by motion estimation unit 42 of FIG. 2). A motion vector, for example, may indicate the displacement of a prediction unit in a current frame relative to a reference sample of a reference frame. A reference block may be a block that is found to closely match the block being coded in terms of pixel difference, which may be determined by sum of absolute difference (SAD), sum of squared difference (SSD), or other difference metrics. The reference block may occur anywhere within a reference frame or reference slice, and not necessarily at a block (e.g., coding unit) boundary of the reference frame or slice. In some examples, the reference block may occur at a fractional pixel position. In other examples, the reference block may occur outside a reference picture boundary defined relative to the current block. Upon finding a block of the reference frame that best matches the current block, an encoder (e.g., motion estimation unit 42 of FIG. 2) may determine the current motion vector for the current portion as the difference in the location from the current block to the matching block in the reference frame (e.g., from the center of the current block to the center of the matching block or from the upper left corner of the current block to the upper left corner of the matching block).

In some examples, an encoder (e.g., prediction module 41 of FIG. 2) may signal the motion vector for each block in the encoded video bitstream. The signaled motion vector is used by the decoder to perform motion compensation in order to decode the video data. However, signaling the entire motion vector may result in less efficient coding, as the motion vectors are typically represented by a large number of bits.

In some instances, rather than signaling the entire motion vector, the encoder (e.g., prediction module 41 of FIG. 2) may predict a motion vector for each partition, i.e., for each PU. In performing this motion vector prediction process, the encoder may determine a set of candidate motion vectors determined for spatially neighboring blocks in the same frame as the current block or a candidate motion vector determined for a co-located block in another reference frame. The encoder may perform motion vector prediction rather than signal an entire motion vector to reduce complexity and bit rate in signaling. The candidate motion vectors from the spatially neighboring blocks may be referred to as spatial MVP candidates, whereas the candidate motion vectors from the co-located blocks in another reference frame may be referred to as temporal MVP candidates.

Two different modes of motion vector prediction have been proposed for the HEVC standard. One mode is referred to as a "merge" mode. The other mode is referred to as adaptive motion vector prediction (AMVP). In merge mode, the encoder instructs a decoder, through bitstream signaling of prediction syntax, to copy a motion vector, reference index (identifying a reference frame, in a given reference picture list, to which the motion vector points) and the motion prediction direction (which identifies the reference picture list (List 0 or List 1), i.e., in terms of whether the reference frame temporally precedes or follows the current frame) from a determined candidate motion vector for a current block of the frame. This is accomplished by signaling in the bitstream an index identifying the candidate block (i.e., the particular spatial MVP candidate or temporal MVP candidate) having the determined candidate motion vector.

Thus, for merge mode, the prediction syntax may include a flag identifying the mode (in this case "merge" mode) and an index identifying the location of the determined candidate block. In some instances, the candidate block will be a causal block in reference to the current block. That is, the candidate block will have already been coded. As such, an encoder or decoder has already received and/or determined the motion vector, reference index, and motion prediction direction for the candidate block. As such, for decoding, the decoder may simply retrieve the motion vector, reference index, and motion prediction direction associated with the candidate block from memory and copy these values for the current block. To decode a block in merge mode, the decoder obtains the predictor block and adds the residual data to the predictor block to reconstruct the coded block.

In AMVP mode, the encoder instructs the decoder, through bitstream signaling, to only copy the motion vector from the candidate portion, and signals the reference frame and the prediction direction separately. In AMVP, the motion vector to be copied may be signaled by sending a motion vector difference (MVD). A MVD is the difference between the current motion vector for the current block and a candidate motion vector for a candidate block. In this case, the encoder determines an actual motion vector for the block to be coded, using motion estimation, and then determines the difference between the actual motion vector and the motion vector predictor as the MVD value. In this way, the decoder need not use an exact copy of the candidate motion vector for the current motion vector, as in the merge mode, but may rather use a candidate motion vector that may be "close" in value to the current, actual motion vector determined from motion estimation and add the MVD to reproduce the current motion vector. Again, the decoder adds the corresponding residual data to reconstruct the coded block.

In most circumstances, the MVD requires fewer bits to signal than the entire current motion vector. As such, AVMP allows for more precise signaling of the current motion vector while improving coding efficiency over sending the whole motion vector. In contrast, the merge mode does not allow for the specification of an MVD, and as such, merge mode sacrifices accuracy of motion vector signaling for increased signaling efficiency (i.e., fewer bits). The prediction syntax for AVMP may include a flag for the mode (in this case AMVP), the index for the candidate block, the MVD between the current motion vector and the candidate motion vector for the candidate block, the reference index, and the motion prediction direction.

Figure 4A:
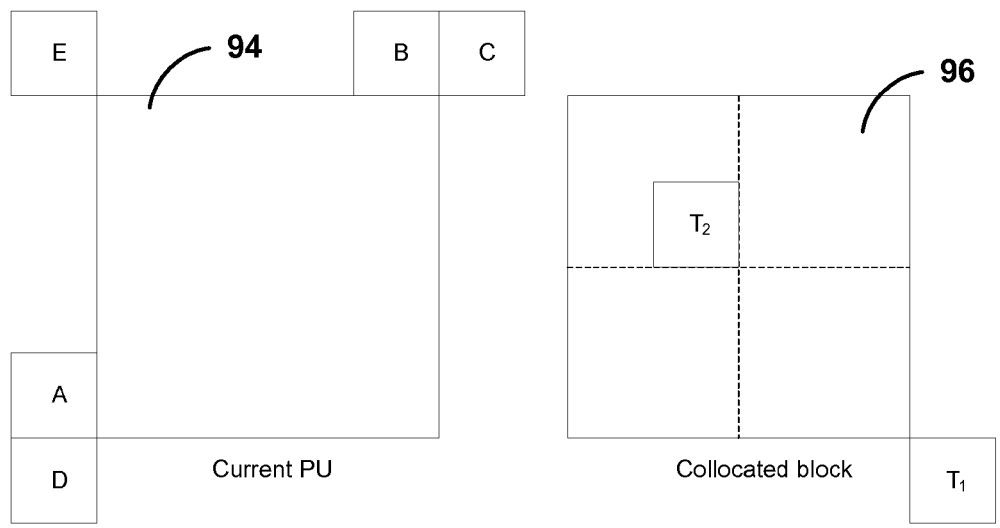
FIG. 4A is a conceptual diagram illustrating spatial and temporal neighboring video blocks from which motion vector predictor candidates are determined for an adaptive motion vector prediction mode.
Figure 4B:
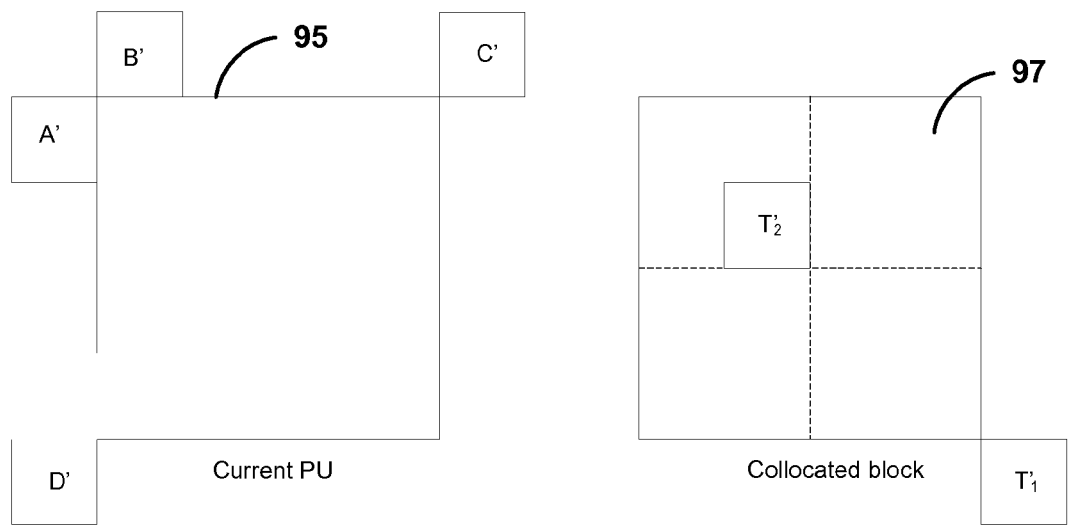
FIG. 4B is a conceptual diagram illustrating spatial and temporal neighboring video blocks from which motion vector predictor candidates are determined for a merge mode.

FIG. 4A is a conceptual diagram illustrating spatial and temporal neighboring video blocks from which motion vector predictor candidates are determined for an adaptive motion vector prediction mode. FIG. 4B is a conceptual diagram illustrating spatial and temporal neighboring video blocks from which motion vector predictor candidates are determined for a merge mode. In either mode, each of video encoder 20 (e.g., prediction module 41 of FIG. 2) and video decoder 30 (e.g., prediction module 81 of FIG. 3) determines the same motion vector predictor candidate list from which to determine a motion vector for a current PU 94 or 95. The motion vector predictor candidates in the AMVP mode may include motion vectors for spatial neighboring blocks of current PU 94. For example, neighboring blocks A, B, C, D and E illustrated in FIG. 4A. The motion vector prediction candidates in merge mode may include motion vectors for spatial neighboring blocks of current PU 95. For example, neighboring blocks A', B', C' and D' illustrated in FIG. 4B. The motion vector predictor candidates may also include motion vectors for temporal neighboring blocks of a collocated block 96 of current PU 94 or collocated block 97 of current PU 95. For example, neighboring blocks $T_1$, $T_2$, $T'_1$ and $T'_2$ illustrated in FIG. 4A and FIG. 4B. Other configurations of motion vector predictor candidate blocks may be used for each mode. In some cases, the motion vector predictor candidates may include combinations of motion vectors for two or more of the neighboring blocks, e.g., an average, median, or weighted average of the two or more motion vectors.

In the case of the AMVP mode, the motion vector predictor candidate list may be determined to include the motion vectors for the spatial or temporal neighboring blocks. Video encoder 20 then determines the most accurate motion vector predictor candidate for current PU 94 from the candidate list. In one example, video encoder 20 may determine a motion vector predictor candidate generated from the motion vector of one of the neighboring blocks as the motion vector predictor for current PU 94. In another example, video encoder 20 may determine a motion vector predictor candidate generated from the motion vectors of two or more of the neighboring blocks as the motion vector predictor for current PU 94. In this case, the motion vector predictor may be calculated as the average, median, or weighted average value of the two or more motion vectors. Video encoder 20 then determines the motion vector difference between the motion vector predictor and a motion vector for current PU 94. Video encoder 20 then signals the motion vector difference and a motion vector predictor index for current PU 94 to video decoder 30.

Video decoder 30 receives a bitstream representing an encoded video block including motion vector differences and motion vector predictor indexes for the video block. To decode the video block, video decoder 30 generates a motion vector predictor candidate list in the same manner as video encoder 20. Video decoder 30 determines a motion vector predictor for current PU 94 by applying the signaled motion vector predictor index for current PU 94 to the candidate list. Video decoder 30 then combines the signaled motion vector difference with the determined motion vector predictor to reconstruct the motion vector for current PU 94. Video decoder 30 uses the motion vector for current PU 94 to locate a predictive block in a reference picture to reconstruct the encoded video block.

In the case of the merge mode, the motion vector predictor candidate list may be generated to include all the motion information, including the motion vector, the reference picture index, and the prediction direction, for each of the spatial or temporal neighboring blocks. Video encoder 20 then determines the most accurate motion information for current PU 95 from the neighboring blocks in the candidate list. Instead of signaling a motion vector difference, a reference picture index, and a prediction direction for current PU 95 to video decoder 30, video encoder 20 directly uses the determined motion information for the neighboring block as the final motion information for current PU 95. In this way, video encoder 20 only signals an index to indicate the neighboring block from which all the motion information should be derived for current PU 95 to video decoder 30.

Video decoder 30 receives a bitstream representing an encoded video block including index values for the video block. To decode the video block, video decoder 30 determines a motion vector predictor candidate list in the same manner as video encoder 20. Video decoder 30 determines all the motion information, including the motion vector, the reference picture index, and the prediction direction, for current PU 95 by applying the signaled index to the candidate list to determine the motion information of the neighboring block. Video decoder 30 then uses the motion vector for current PU 95 to locate a predictive block to reconstruct the encoded video block.

Figure 5:
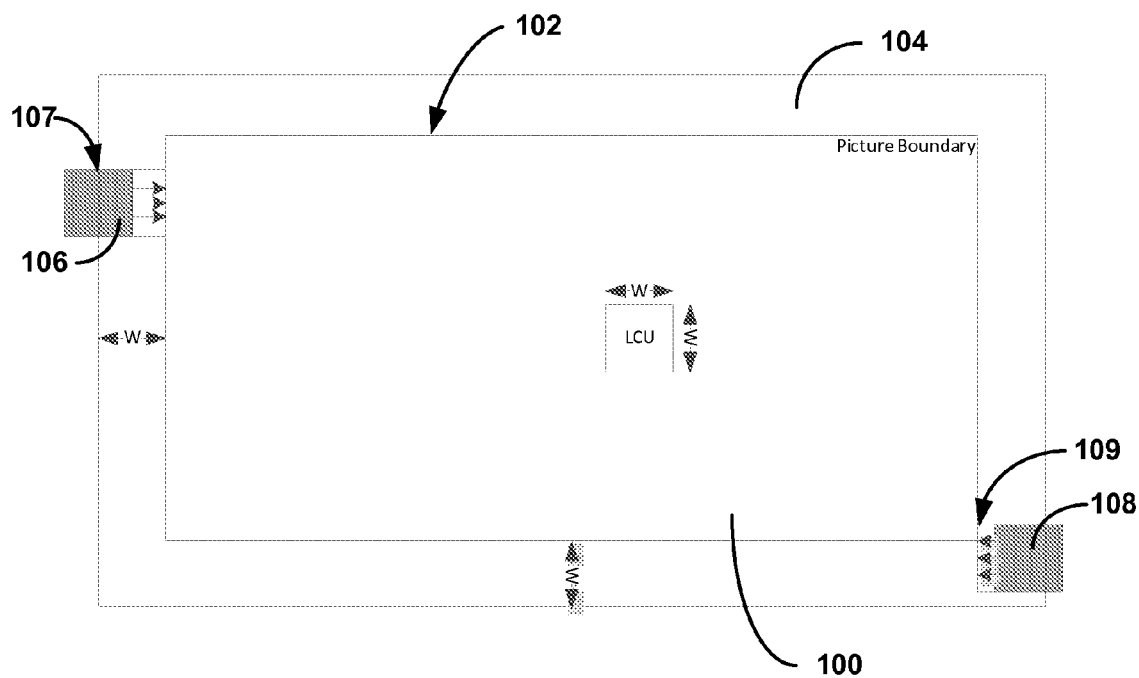
FIG. 5 is a conceptual diagram illustrating a reference picture and prediction blocks located outside a reference picture boundary by motion vector predictor candidates for a current video block.

FIG. 5 is a conceptual diagram illustrating a reference picture 100 and prediction blocks 106 and 108 located outside a reference picture boundary 102 by motion vector predictor candidates for a current PU or video block 94. Currently in the merge mode or the AMVP mode, a motion vector predictor candidate that identifies a prediction block, e.g., 106 or 108, located outside of reference picture boundary 102 relative to current PU 94 is clipped to relocate the prediction block within padding region 104. Reference picture boundary 102 is determined as a multiple of the minimum CU size. For example, if the minimum CU size is 8×8, and the region to be coded is 33×33, then the picture is coded as a 40×40 region with a cropping region of 33×33. The cropping region is not typically defined for the decoder. The decoder may decode a region that is some multiple of the minimum CU size. The padding that happens for motion compensation starts from the boundaries of the 40×40 region by repeating the pixels at the boundary of the 40×40 region effectively to infinity. The techniques of this disclosure eliminate clipping of the motion vector predictor candidates.

As an example, a neighboring block, e.g., block E from FIG. 4A, of current PU 94 may have a motion vector that points to a prediction block (not shown in FIG. 5) located at the lower right edge of associated reference picture 100. The motion vector predictor candidate, when applied to current PU 94, has the same dimensions and direction as for the neighboring block but with a starting point translated to the upper left corner of current PU 94. As illustrated in FIG. 4A, current PU 94 is located further to the right than neighboring block E. The motion vector predictor candidate relative to current PU 94, therefore, may point to predictive block 108 located outside of reference picture boundary 102. In other words, the "start" of the motion vector predictor candidate relative to current PU 94 shifts so that the "end" of the motion vector predictor candidate may point to a region outside reference picture boundary 102.

Traditionally, motion vectors determined for current video block 94 are clipped to values so that the entire prediction block is included within reference picture boundary 102. The clipping process is used to effectively clip the motion vector values prior to motion compensation in order to determine residual data for the current video block based on pixel values of a prediction block. In order to determine the pixel values of the prediction block, the prediction block is preferably located within reference picture 100 or at least within padding region 104.

In general, the area outside of reference picture boundary 102 is preferably represented by some set of values. The area outside of reference picture boundary 102 is not a vacuum (i.e., not zero values). Instead, the area outside the reference picture boundary, in many circumstances, corresponds to pixel values for neighboring reference pictures. A neighboring reference picture may not be available because it has not been encoded/decoded yet, or the values for the reference picture may not be stored in memory. Video decoder 30, therefore, may generate padding region 104 by replicating pixel values from the edge of reference picture 100. The value at the edge of the picture is used for repetitive padding. The padding region size, in theory, is infinite. In practice, a video coder would be configured to pad by the largest prediction unit size. Additional padding may be used for interpolation filters. Padding region 104, as shown in FIG. 5, may have a width equal to the width of the largest size block, e.g., the treeblock or the LCU. Video decoder 30, however, may generate the padding region using replicated pixel values to be of any size.

In the current HM, for the merge mode and the AMVP mode, the clipping process is also used to effectively clip motion vector predictor candidates for current PU 94 and/or 95 prior to use for motion vector prediction. The determined motion vector predictor candidates are clipped to ensure the entire prediction block, e.g., 106 or 108, located relative to current PU 94 is included within reference picture boundary 102. The clipping process to ensure prediction blocks are within reference picture boundary 102 occurs both for spatial and temporal motion vector predictor candidates.

The clipping operation is implemented as the following algorithm.

```
Void TComDataCU::clipMv (TComMv & rcMv)
{
    Int iMvShift = 2;
    Int iHorMax = (m_pcSlice->getSPS( )->getWidth( ) –
    m_uiCUPelX –
1)<<iMvShift;
    Int iHorMin = (–(Int)g_uiMaxCUWidth – (Int)m_uiCUPelX +
    1 )<<iMvShift;
    Int iVerMax = (m_pcSlice->getSPS( )->getHeight( ) –
    m_uiCUPelY –
1)<<iMvShift;
    Int iVerMin = (–(Int)g_uiMaxCUHeight – (Int)m_uiCUPelY +
    1 )<<iMvShift;
    rcMv.setHor(min(iHorMax, max (iHorMin, rcMv.getHor( ))));
    rcMv.setVer(min(iVerMax, max (iVerMin, rcMv.getVer( ))));
}
```

The variables in this algorithm are defined as follows:
m_pcSlice→getSPS( )→getWidth( ):picture width in pixels
m_pcSlice→getSPS( )→getHeight( ):picture height in pixels
g_uiMaxCUWidth: maximum CU width in pixels
g_uiMaxCUHeight: maximum CU height in pixels
m_uiCUPelX: CU horizontal address within an LCU in pixels
m_uiCUPelY: CU vertical address within and LCU in pixels rcMv.getHor( ): horizontal motion vector in quarter pixel units rcMv.getVer( ): vertical motion vector in quarter pixel units The motion vector predictor candidates may be clipped to shift the identified prediction blocks 106 and 108 to be at least within padding region 104. As illustrated in FIG. 5, the motion vector predictor candidates may be clipped to relocate prediction blocks 106 and 108 to be at least entirely within padding region 104 around reference picture 100, but not necessarily within reference picture boundary 102. When a motion vector predictor candidate locates a prediction block either within reference picture boundary 102 or outside of reference picture boundary 102, but still entirely within padding region 104, the motion vector predictor candidate remains unclipped.

In one proposal for HEVC, when motion vector predictor candidates point to prediction blocks (e.g., prediction blocks 106 and 108) located outside of reference picture boundary 102, video decoder 30 and/or video encoder 20 clips the motion vector predictor candidates to relocate prediction blocks 106 and 108 within padding region 104. For example, video decoder 30 may clip a motion vector predictor candidate such that the upper left corner of prediction block 108 will move to location 109 to ensure the entirety of prediction block 108 is within padding region 104. Similarly, video decoder 30 may clip a motion vector predictor candidate such that the upper left corner of prediction block 106 will move to location 107 to ensure the entirety of prediction block 106 is within padding region 104.

When a clipped motion vector predictor candidate is determined to encode a current video block, different motion vector information may need to be signaled to video decoder 30 than in the case of an unclipped motion vector predictor candidate. For example, in the case of the AMVP mode, if a motion vector predictor candidate relative to current PU 94 points to prediction block 106 with coordinates (−5, 3) but padding region 104 only extends to an x-coordinate of −2, the motion vector predictor candidate will be clipped based on the size of padding region 104 to point to coordinates (−2, 3), e.g., location 107. If video encoder 20 then determines the clipped motion vector predictor candidate as the motion vector predictor for current PU 94, which also has a motion vector that points to coordinates (−5, 3), video encoder 20 must signal a motion vector difference of −3 between the motion vector of current PU 94 and the clipped motion vector predictor. If the motion vector predictor candidate had remained unclipped, video encoder 20 could have signaled the motion vector difference as a delta zero.

According to the techniques of this disclosure, the motion vector predictor candidate clipping process is removed from the motion vector predictor candidate list generation process. Specifically, when a motion vector predictor candidate relative to current PU 94 points to a prediction block, e.g., 106 or 108, outside of reference picture boundary 102, video encoder 20 and/or decoder 30 will not clip or otherwise truncate the motion vector predictor candidate. Instead, the unclipped version of the motion vector predictor candidate will be included in the motion vector predictor candidate list. The techniques may remove the clipping process from the candidate list determination process by not calling the clipping algorithm, set forth above, while determining the motion vector predictor candidates for current PU 94.

Video encoder 20 and/or video decoder 30 will not clip a motion vector predictor candidate for current PU 94 or 95 in the AMVP mode or the merge mode even if the motion vector predictor candidate points to a reference picture located outside of reference picture boundary 102 relative to current PU 94. The AMVP mode candidate list (e.g., the candidates shown for current PU 94 of FIG. 4A) and the merge mode candidate list (e.g., the candidates shown for current PU 95 of FIG. 4B) may, therefore, be formed from unclipped versions of the motion vector predictor candidates determined by the merge mode and the AMVP mode candidate list determination process. For example, when determining the motion vector predictor candidate list, video encoder 20 and/or video decoder 30 include unclipped versions of the motion vector predictor candidates regardless of the locations of the prediction blocks, e.g., prediction block 106 or 108, identified by the motion vector predictor candidates relative to current PU 94.

According to the techniques of this disclosure, none of the motion vector predictor candidates will be clipped during the motion vector prediction candidate generation process. In this way, video encoder 20 and video decoder 30 do not need to perform a check of each of the motion vector predictor candidates included in the candidate list to determine whether the particular motion vector predictor candidate needs to be clipped. In one proposal for HEVC, video encoder 20 and video decoder 30 may need to check all of the motion vector predictor candidates, e.g., five to ten candidates, for each video block to be encoded. As such, there may be as many as 5 to 10 candidate motion vectors that may need to be clipped. By removing the clipping process from the motion vector prediction candidate generation process, the techniques of the disclosure, therefore, reduce complexity at both video encoder 20 and video decoder 30.

Furthermore, according to the techniques, current PU 94 or 95 may be coded based on a determined unclipped motion vector predictor candidate. For example, in the case of the AMVP mode, video encoder 20 determines the most accurate unclipped motion vector predictor candidate for current PU 94 from the candidate list. Video encoder 20 then signals the motion vector difference and a motion vector predictor index for current PU 94 to video decoder 30. Video decoder 30 receives a bitstream representing an encoded video block including motion vector differences and motion vector predictor indexes for the video block. Video decoder 30 determines the unclipped motion vector predictor candidate for current PU 94 by applying the signaled motion vector predictor index for current PU 94 to the candidate list. Video decoder 30 then combines the signaled motion vector difference with the determined unclipped motion vector predictor candidate to reconstruct the motion vector for current PU 94. Video decoder 30 uses the motion vector for current PU 94 to locate a predictive block in a reference picture to reconstruct the encoded video block.

As another example, in the case of the merge mode, video encoder 20 determines the most accurate motion information, including an unclipped motion vector predictor candidate, for current PU 95 from the neighboring blocks in the candidate list. Video encoder 20 signals an index to indicate the neighboring block from which all the motion information should be derived for current PU 95 to video decoder 30. Video decoder 30 receives a bitstream representing an encoded video block including index values for the video block. Video decoder 30 determines all the motion information, including the unclipped motion vector predicator candidate, for current PU 95 by applying the signaled index to the candidate list. Video decoder 30 then determines the motion vector for current PU 95 to be equivalent to the determined unclipped motion vector predictor candidate. Video decoder 30 then uses the motion vector for current PU 95 to locate a predictive block to reconstruct the encoded video block.

In some cases, the motion vector determined for current PU 94 or 95 based on the determined unclipped motion vector predictor candidate may be outside of a reference picture boundary. This unclipped motion vector may then be clipped during motion compensation. As such, the techniques of this disclosure prevent the unnecessary clipping of motion vector candidates during the motion vector prediction candidate determination process, but instead, only clip motion vectors outside of a reference picture boundary if they are actually used for motion compensation.

For example, when a motion vector predictor candidate for the merge mode or the AMVP mode is used without clipping, the motion vector for current PU 94 or 95 is determined from the motion vector predictor candidate may point to a prediction block that is outside of reference picture boundary 102. This issue, however, is handled during motion compensation by the padding process and/or the clipping process. More specifically, when the determined motion vector points to a prediction block located outside of reference picture boundary 102, a video encoder 20 or video decoder 30 may expand padding region 104 to include the prediction block, or may clip the determined motion vector to relocate the prediction block within padding region 104. In either case, the identified prediction block used to reconstruct the encoded video block will include padding region values, i.e., pixel values replicated from the edge of reference picture 102.

The use of unclipped motion vector predictor candidates for the merge mode and the AMVP mode does not alter the motion compensation process while reducing complexity at video encoder 20 and video decoder 30. According to the techniques of this disclosure, the clipping process is removed from the motion vector predictor candidate list determination process, such that the motion vector predictor candidates remain unclipped. The motion vector for current PU 94 or 95 determined from a determined unclipped motion vector predictor candidate may still be clipped during motion compensation, however, if the prediction block used to predict pixel values during motion compensation falls outside reference picture boundary 102. In this way, video encoder 20 or video decoder 30 still relocates the prediction block to be within reference picture boundary 102 or within padding region 104 without having to clip all the motion vector predictor candidates included in the candidate list.

For example, in the case of the AMVP mode, video decoder 30 determines an unclipped motion vector predictor candidate for current PU 94 by applying the signaled motion vector predictor index for current PU 94 to the candidate list. The determined unclipped motion vector predictor candidate may indicate a prediction block located outside reference picture boundary 102 relative to current PU 94. In some cases, the signaled motion vector difference, when combined with the determined unclipped motion vector predictor candidate to determine the motion vector for current PU 94, will bring the prediction block within reference picture boundary 102. In other cases, the determined motion vector for current PU 94 will still indicate a prediction block located outside reference picture boundary 102, which requires additional padding or clipping.

As another example, in the case of the merge mode, video decoder 30 determines all the motion information, including the unclipped motion vector predicator candidate, for current PU 96 by applying the signaled index to the candidate list. The determined unclipped motion vector predictor candidate may indicate a prediction block located outside reference picture boundary 102 relative to current PU 96. In the merge mode, video decoder 30 determines the motion vector for current PU 96 to be equivalent to the determined unclipped motion vector predictor candidate. The determined motion vector for current PU 96, therefore, will still indicate a prediction block located outside reference picture boundary 102, which requires additional padding or clipping.

Figure 6:
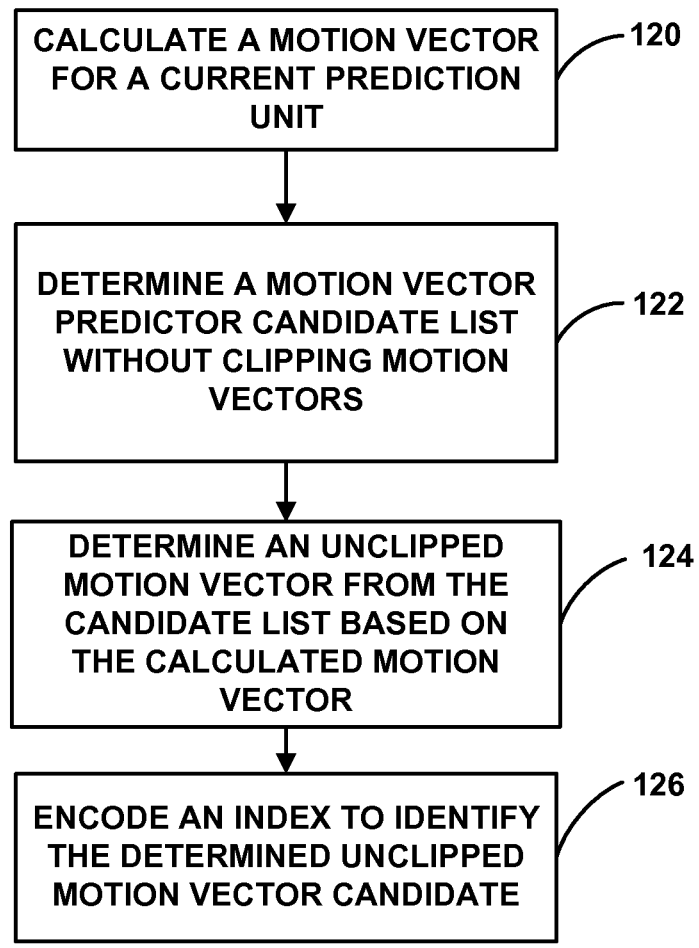
FIG. 6 is an example flowchart of a method for encoding video using the techniques of this disclosure.

FIG. 6 is an example flowchart of a method for encoding video using the techniques of this disclosure. Video encoder 20 may initially calculate a motion vector for a current prediction unit of a video block (120), for example using a motion estimation process as described above. Next, video encoder 20 determines a motion vector predictor candidate list without clipping motion vectors (122). As described above, different motion vector predictor candidate lists may be produced depending on the type of motion vector prediction process being used (e.g., AMVP or merge mode). For example, motion vectors from the neighboring blocks shown in FIG. 4A for PU 94 may be included in the motion vector predictor candidate list for PU 94 for AMVP mode, while motion vectors from the neighboring blocks shown in FIG. 4B for PU 95 may be included in the motion vector predictor candidate list for PU 95 for merge mode.

Based on the calculated motion vector, video encoder 20 then determines an unclipped motion vector from the motion vector candidate list (124). The determined candidate motion vector remains unclipped, regardless of whether it points to a reference block that is inside or outside a picture boundary relative to the current coded PU. Next, video encoder 20 encodes an index to identify the determined unclipped motion vector candidate (126). In merge mode, only the index of the determined unclipped motion vector candidate is encoded, as motion information other than the motion vector (e.g., reference frame index, prediction direction) are also copied from the determined candidate motion vector. In AMVP mode, additional motion information may also be encoded, including the motion vector difference (i.e., the difference between the calculated motion vector and the determined unclipped motion vector), the reference frame index, and the prediction direction. Video encoder 20 may clip any determined motion vectors that are actually used for motion compensation during the motion compensation process.

Figure 7:
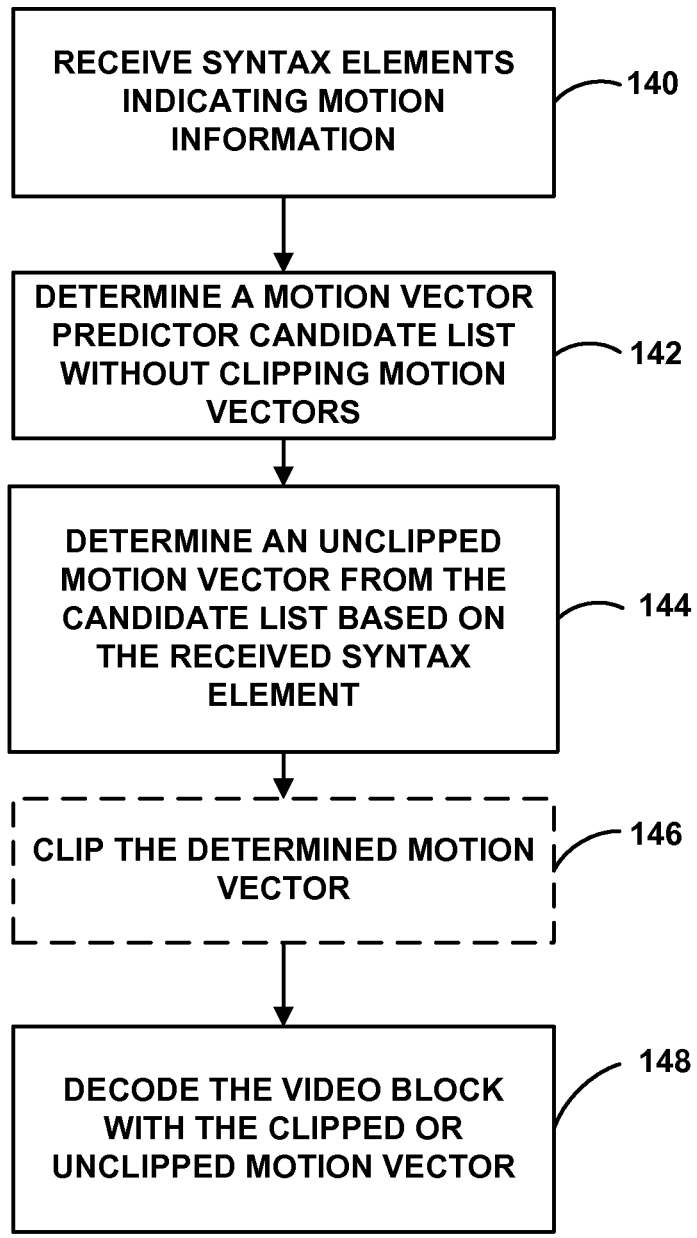
FIG. 7 is an example flowchart of a method for decoding video using the techniques of this disclosure.

FIG. 7 is an example flowchart of a method for decoding video using the techniques of this disclosure. Initially, video decoder 30 receives syntax elements indicating motion information (140). If the particular video block being decoded is operating under merge mode, the syntax elements indicating the motion information may include an index identifying a particular motion vector candidate from a motion vector candidate list. Again, the particular motion vector candidate list being used may depend on the motion vector prediction mode being used (e.g., AMVP or merge mode). If the particular video block being decoded is operating under AMVP mode, the syntax elements indicating the motion information may include an index identifying a particular motion vector candidate from a motion vector candidate list, a motion vector difference, a reference frame index, and a prediction direction.

Next, video decoder 30 determines a motion vector predictor candidate list without clipping motion vectors (142). Again, as with video decoder 20, the particular candidate list that is used may be dependent on the motion vector prediction process being used. The motion vectors in the motion vector candidate list are not clipped, regardless of whether they point to reference block that are inside of outside a reference picture boundary relative to the video block current being decoded. Based on the received syntax elements, the video decoder 30 determines an unclipped motion vector from the motion vector candidate list (144). If the particular motion vector that is determined happens to point to a reference picture that is outside a reference picture boundary relative to the current video block being decoded, video decoder 30 may then clip the determined motion vector for use during a motion compensation process (146). In this case, the clipping of the motion vector is a non-normative process, because theoretically the padding is infinite and clipping may not be necessary if you pad enough. The clipping process mentioned here should only affect the motion compensation process. That is, the clipped motion vector is only used for motion compensation, and should not be used for future motion vector derivation, etc. In this way, only the motion vectors that point to reference pictures outside a reference picture boundary that are actually used are clipped instead or clipping all motion vector prediction candidates that are outside the reference picture boundary.

Video decoder 30 then decodes the current video block using the clipped motion vector (if the determined motion vector is outside the reference picture boundary) or unclipped motion vector (if the determined motion vector is not outside the reference picture boundary) using a motion compensation process (148). In merge mode, the motion vector, reference frame, and prediction direction used for motion compensation are copied directly from the motion vector candidate determined from the received motion information syntax elements. In AMVP, the reference frame and prediction direction are indicated explicitly in the received motion information syntax elements. The motion vector used for motion compensation is calculated by adding the received motion vector difference to the determined motion vector.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
   determining a motion vector predictor candidate list that includes motion vector predictor candidates specifying motion vectors from neighboring video blocks of a current video block of the video data, wherein the motion vector predictor candidates are not clipped and the candidate list includes at least one motion vector predictor candidate that, relative to the current video block, identifies a prediction block located outside a boundary of a reference picture;
   decoding, from a bitstream, a motion vector predictor index that identifies a determined unclipped motion vector predictor candidate in the motion vector predictor candidate list;
   decoding, from the bitstream, a motion vector difference between the determined unclipped motion vector predictor candidate and a motion vector for the current video block, wherein the motion vector for the current video block identifies a same or different prediction block located outside the boundary of the reference picture;
   determining the motion vector for the current video block based on the motion vector difference and the determined unclipped motion vector predictor candidate in the motion vector predictor candidate list;
   clipping the motion vector for the current video block such that the prediction block identified by the clipped motion vector is relocated within a padding region around the reference picture; and
   decoding the current video block with respect to the relocated prediction block, wherein the relocated prediction block includes padding region values.

2. The method of claim 1, wherein the padding region values of the relocated prediction block comprise replicated pixel values from an edge of the reference picture.

3. The method of claim 1, wherein the neighboring video blocks comprise one or more of spatial neighboring video blocks of the current video block and temporal neighboring video blocks of a collocated block of the current video block.

4. An apparatus configured to decode video data, the apparatus comprising:
   means for determining a motion vector predictor candidate list that includes motion vector predictor candidates specifying motion vectors from neighboring video blocks of a current video block of the video data, wherein the motion vector predictor candidates are not clipped and the motion vector predictor candidate list includes at least one motion vector predictor candidate that, relative to the current video block, identifies a prediction block located outside a boundary of a reference picture;
   means for decoding, from a bitstream, a motion vector predictor index that identifies a determined unclipped motion vector predictor candidate in the motion vector predictor candidate list;
   means for decoding, from the bitstream, a motion vector difference between the determined unclipped motion vector predictor candidate and a motion vector for the current video block, wherein the motion vector for the current video block identifies a same or different prediction block located outside the boundary of the reference picture;
   means for determining the motion vector for the current video block based on the motion vector difference and the determined unclipped motion vector predictor candidate in the motion vector predictor candidate list;
   means for clipping the motion vector for the current video block such that the prediction block identified by the clipped motion vector is relocated within a padding region around the reference picture; and
   means for decoding the current video block with respect to the relocated prediction block, wherein the relocated prediction block includes padding region values.

5. The apparatus of claim 4, wherein the padding region values of the relocated prediction block comprise replicated pixel values from an edge of the reference picture.

6. The apparatus of claim 4, wherein the neighboring video blocks comprise one or more of spatial neighboring video blocks of the current video block and temporal neighboring video blocks of a collocated block of the current video block.

7. An apparatus configured to decode video data, the apparatus comprising:
   a memory configured to store the video data; and
   one or more processors configured to:
      determine a motion vector predictor candidate list that includes motion vector predictor candidates specifying motion vectors from neighboring video blocks of a current video block of the video data, wherein the motion vector predictor candidates are not clipped and the motion vector predictor candidate list includes at least one motion vector predictor candidate that, relative to the current video block, identifies a prediction block located outside a boundary of a reference picture;
      decode, from a bitstream, a motion vector predictor index that identifies a determined unclipped motion vector predictor candidate in the motion vector predictor candidate list;
      decode, from the bitstream, a motion vector difference between the determined unclipped motion vector predictor candidate and a motion vector for the current video block, wherein the motion vector for the current video block identifies a same or different prediction block located outside the boundary of the reference picture;
      determine the motion vector for the current video block based on the motion vector difference and the determined unclipped motion vector predictor candidate in the motion vector predictor candidate list;
      clip the motion vector for the current video block such that the prediction block identified by the clipped motion vector is relocated within a padding region around the reference picture; and
      decode the current video block with respect to the relocated prediction block, wherein the relocated prediction block includes padding region values.

8. The apparatus of claim 7, wherein the padding region values of the relocated prediction block comprise replicated pixel values from an edge of the reference picture.

9. The apparatus of claim 7, wherein the neighboring video blocks comprise one or more of spatial neighboring video blocks of the current video block and temporal neighboring video blocks of a collocated block of the current video block.

10. A non-transitory computer-readable medium having instructions stored thereon that, when executed, cause a processor configured to decode video data to:
   determine a motion vector predictor candidate list that includes motion vector predictor candidates specifying motion vectors from neighboring video blocks of a current video block of the video data, wherein the motion vector predictor candidates are not clipped and the motion vector predictor candidate list includes at least one motion vector predictor candidate that, relative to the current video block, identifies a prediction block located outside a boundary of a reference picture;
   decode, from a bitstream, a motion vector predictor index that identifies a determined unclipped motion vector predictor candidate in the motion vector predictor candidate list;
   decode, from the bitstream, a motion vector difference between the determined unclipped motion vector predictor candidate and a motion vector for the current video block, wherein the motion vector for the current video block identifies a same or different prediction block located outside the boundary of the reference picture;
   determine the motion vector for the current video block based on the motion vector difference and the determined unclipped motion vector predictor candidate in the motion vector predictor candidate list;
   clip the motion vector for the current video block such that the prediction block identified by the clipped motion vector is relocated within a padding region around the reference picture; and
   decode the current video block with respect to the relocated prediction block, wherein the relocated prediction block includes padding region values.

11. The non-transitory computer-readable medium of claim 10, wherein the padding region values of the relocated prediction block comprise replicated pixel values from an edge of the reference picture.

12. The non-transitory computer-readable medium of claim 10, wherein the neighboring video blocks comprise one or more of spatial neighboring video blocks of the current video block and temporal neighboring video blocks of a collocated block of the current video block.

13. A method of encoding video data, the method comprising:
   determining a motion vector predictor candidate list that includes motion vector predictor candidates specifying motion vectors from neighboring video blocks of a current video block of the video data, wherein the motion vector predictor candidates are not clipped and the motion vector predictor candidate list includes at least one motion vector predictor candidate that, relative to the current video block, identifies a prediction block located outside a boundary of a reference picture;
   signaling, in a bitstream, a motion vector predictor index that identifies a determined unclipped motion vector predictor candidate in the motion vector predictor candidate list;
   signaling, in the bitstream, a motion vector difference between the determined unclipped motion vector predictor candidate and a motion vector for the current video block, wherein the motion vector for the current video block identifies a same or different prediction block located outside the boundary of the reference picture;
   clipping the motion vector for the current video block such that the prediction block identified by the clipped motion vector is relocated within a padding region around the reference picture; and
   encoding the current video block with respect to the relocated prediction block, wherein the relocated prediction block includes padding region values.

14. The method of claim 13, wherein the padding region values of the relocated prediction block comprise replicated pixel values from an edge of the reference picture.

15. An apparatus configured to encode video data, the apparatus comprising:
   means for determining a motion vector predictor candidate list that includes motion vector predictor candidates specifying motion vectors from neighboring video blocks of a current video block of the video data, wherein the motion vector predictor candidates are not clipped and the motion vector predictor candidate list includes at least one motion vector predictor candidate that, relative to the current video block, identifies a prediction block located outside a boundary of a reference picture;
   means for signaling, in a bitstream, a motion vector predictor index that identifies a determined unclipped motion vector predictor candidate in the motion vector predictor candidate list;
   means for signaling, in the bitstream, a motion vector difference between the determined unclipped motion vector predictor candidate and a motion vector for the current video block, wherein the motion vector for the current video block identifies a same or different prediction block located outside the boundary of the reference picture;
   means for clipping the motion vector for the current video block such that the prediction block identified by the clipped motion vector is relocated within a padding region around the reference picture; and
   means for encoding the current video block with respect to the relocated prediction block, wherein the relocated prediction block includes padding region values.

16. The apparatus of claim 15, wherein the padding region values of the relocated prediction block comprise replicated pixel values from an edge of the reference picture.

17. An apparatus configured to encode video data comprising:
   a memory configured to store the video data; and
   one or more processors configured to:
      determine a motion vector predictor candidate list that includes motion vector predictor candidates specifying motion vectors from neighboring video blocks of a current video block of the video data, wherein the motion vector predictor candidates are not clipped and the motion vector predictor candidate list includes at least one motion vector predictor candidate that, relative to the current video block, identifies a prediction block located outside a boundary of a reference picture;
      signal, in a bitstream, a motion vector predictor index that identifies a determined unclipped motion vector predictor candidate in the motion vector predictor candidate list;
      signal, in the bitstream, a motion vector difference between the determined unclipped motion vector predictor candidate and a motion vector for the current video block, wherein the motion vector for the current video block identifies a same or different prediction block located outside the boundary of the reference picture;
      clip the motion vector for the current video block such that the prediction block identified by the clipped motion vector is relocated within a padding region around the reference picture; and
      encode the current video block with respect to the relocated prediction block, wherein the relocated prediction block includes padding region values.

18. The apparatus of claim 17, wherein the padding region values of the relocated prediction block comprise replicated pixel values from an edge of the reference picture.

19. A non-transitory computer-readable medium having instructions stored thereon that, when executed, cause a processor configured to encode video data to:
   determine a motion vector predictor candidate list that includes motion vector predictor candidates specifying motion vectors from neighboring video blocks of a current video block of the video data, wherein the motion vector predictor candidates are not clipped and the motion vector predictor candidate list includes at least one motion vector predictor candidate that, relative to the current video block, identifies a prediction block located outside a boundary of a reference picture;
   signal, in a bitstream, a motion vector predictor index that identifies a determined unclipped motion vector predictor candidate in the motion vector predictor candidate list;
   signal, in the bitstream, a motion vector difference between the determined unclipped motion vector predictor candidate and a motion vector for the current video block, wherein the motion vector for the current video block identifies a same or different prediction block located outside the boundary of the reference picture;
   clip the motion vector for the current video block such that the prediction block identified by the clipped motion vector is relocated within a padding region around the reference picture; and
   encode the current video block with respect to the relocated prediction block, wherein the relocated prediction block includes padding region values.

20. The non-transitory computer-readable medium of claim 19, wherein the padding region values of the relocated prediction block comprise replicated pixel values from an edge of the reference picture.

* * * * *